June 11, 1929.    F. X. LAUTERBUR    1,716,701
DOUGH MIXER
Filed July 10, 1925    3 Sheets-Sheet 1
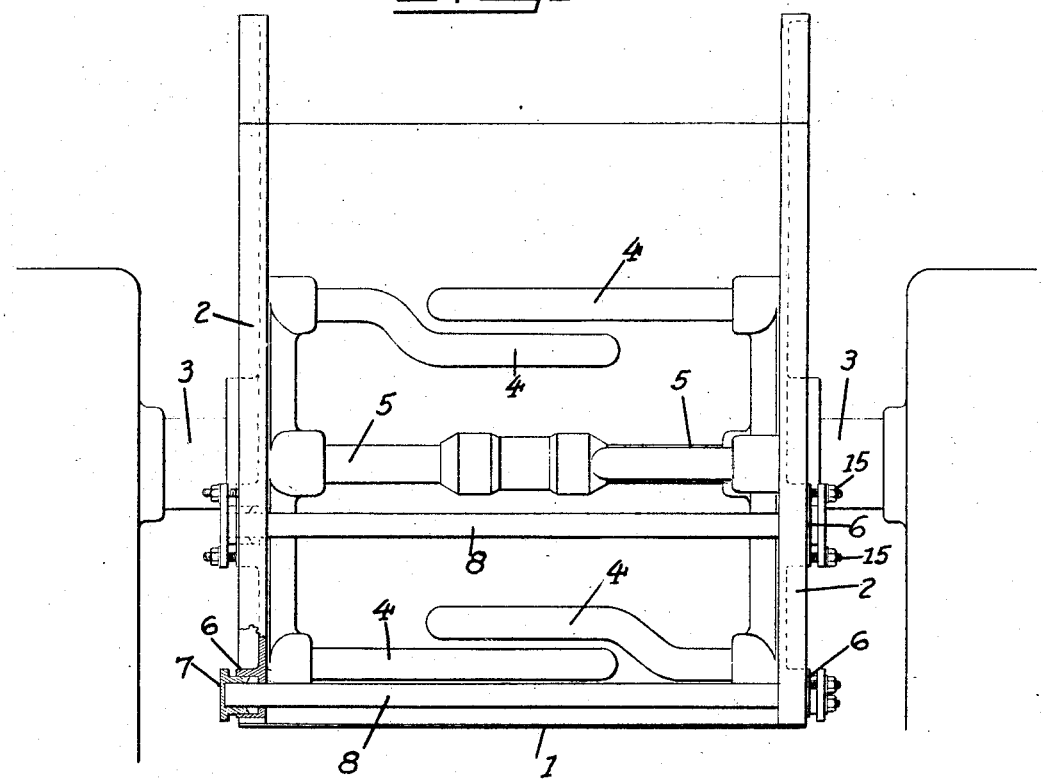
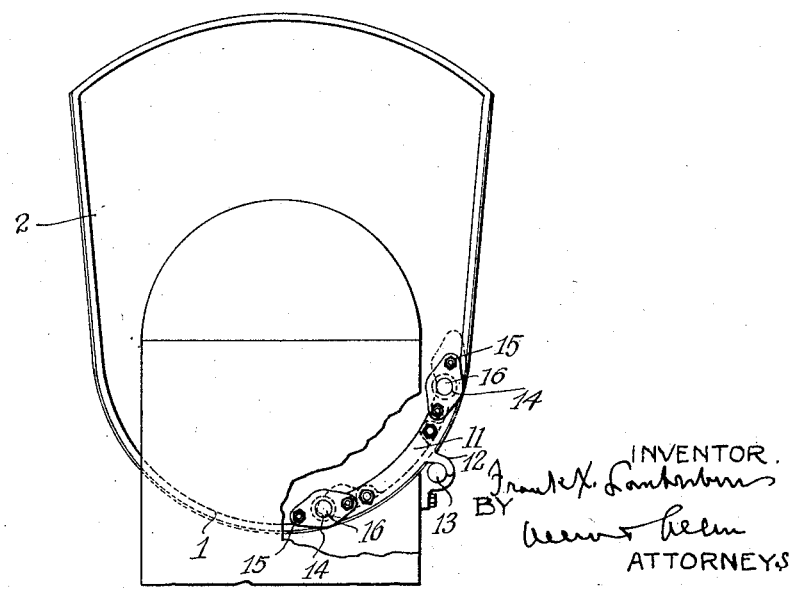

June 11, 1929.  F. X. LAUTERBUR  1,716,701
DOUGH MIXER
Filed July 10, 1925  3 Sheets-Sheet 2
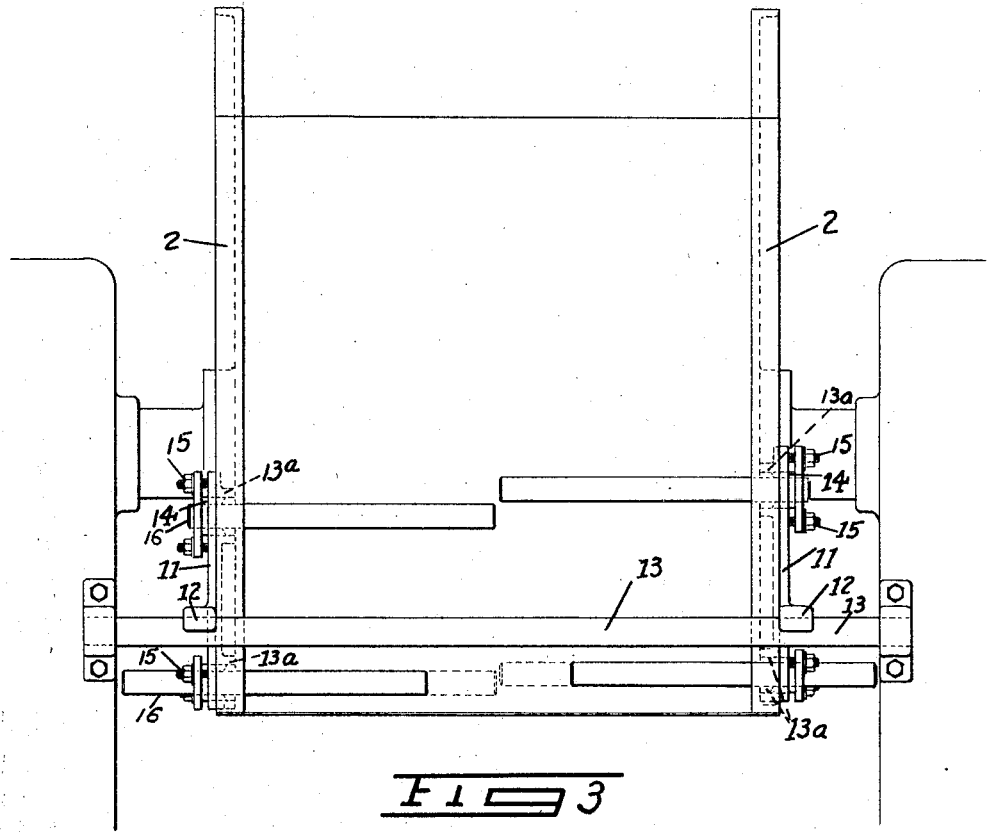
INVENTOR.
Frank X. Lauterbur
BY
ATTORNEYS June 11, 1929.  F. X. LAUTERBUR  1,716,701
DOUGH MIXER
Filed July 10, 1925   3 Sheets-Sheet 3

INVENTOR.
Frank X. Lauterbur
BY
ATTORNEYS

Patented June 11, 1929.

1,716,701

UNITED STATES PATENT OFFICE.

FRANK X. LAUTERBUR, OF SIDNEY, OHIO.

DOUGH MIXER.

Application filed July 10, 1925. Serial No. 42,689.

My invention relates to dough mixers and more particularly to means whereby abutments may be provided in the mixer, located near to or at the walls of the interior vessel, so as to retard the movement of the dough with the mixing blades and thus apply greater extension to the dough.

It has been proposed to bolt or rivet to the inner face of a dough mixer, one or more fixed bars which act as ridges in the bottom or on the sides of the mixer, similar to ribs in various types of devices used in agitation. However, this device while it accomplishes an improved action on the dough is not fully practical structurally, and in its action on the dough is subject to considerable improvement.

It is my object to provide for abutments in the form preferably of rods and bars, supported from the outside of the mixer and not on the inner surface thereof, but which project into the mixer, as desired. It is further my object to provide for mounting the rods or bars in the straight side walls of the mixer on suitable bearings so that the rods can revolve thus cutting down excessive extension and thus heating of the dough, and preventing too much tearing of the dough as opposed to extension thereof.

Among the advantages of mounting the bars in the side walls of the mixer, particularly when from the outside thereof, is the fact that there is a strong frame part as distinguished from the relatively light material of the mixer bottom, and also the fact that heavy castings may be used, particularly in connection with known forms of reinforcement and support, now generally employed in mixers.

Also it is my object to provide that the rods may be adjustable in the bearings provided by me, so that they can be extended to desired degrees into the mixer, or so that they can be set in eccentric bushings, and the bushings rocked to adjust the position of the bars with relation to the mixer bottom.

If abutments or anchorage of the rods within the bowl is desired, it is easy to provide for the same, without subjecting the bowl bottom to excessive strains, or requiring the permanent affixing of the rods in place.

Angular arrangements of the rods can be provided for, and the adjustability and control generally of the system of projecting dough engaging means in a dough mixer, is the prime object of my invention together with the practical feature of providing for a mounting means of strong character.

I accomplish my objects by that certain construction and arrangement of parts to be hereinafter more specifically pointed out and claimed.

In the drawings:

Figure 1 is an elevation of a dough mixer with the bottom removed to expose the interior toward the observer.

Figure 2 is a side elevation of the mixer having a different type structure.

Figure 3 is a front elevation of the mixer of Figure 2 showing the abutment bars and with the bowl bottom removed to expose the bars.

Figure 4:
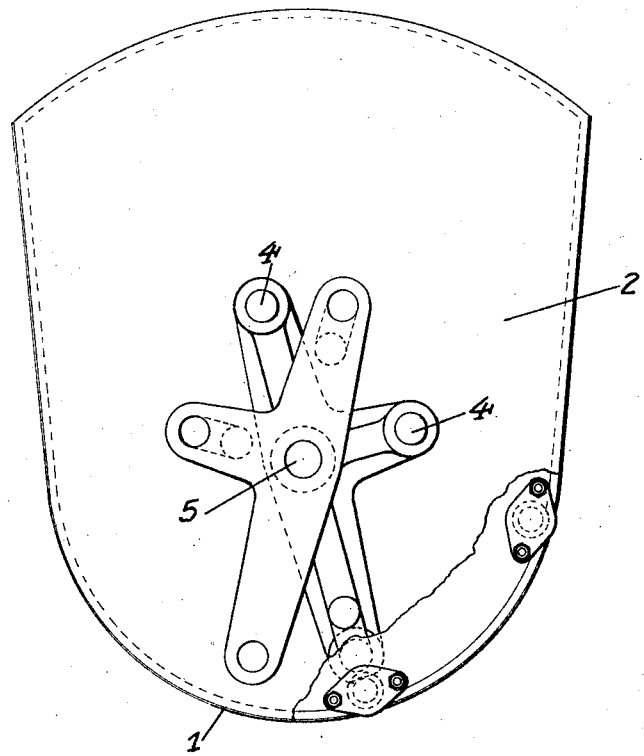
Figure 4 is a side elevation of the bowl, with the side wall mainly broken away to expose the mixer devices, and showing the relation of the mixing blades and abutment bar mounting devices.

Referring to the drawings, I have shown a bowl having a base 1, and sides 2, 2, said sides being supported on the journals 3; the mixing blades 4 have their shafts 5 passing through these journals.

The exact nature of mounting the bowl or operating the blades, or the nature of the blades is not essential, as the effect of the bars being mounted in the sides of the bowl, is the feature involved.

Referring to the device of Figure 1, the sides of the bowl are formed as castings, which have gland bodies 6 formed therein. Gland heads 7 are provided which have sockets to receive the ends of bars 8 that pass through the bodies 6 and across the inside of the bowl. By removing the gland heads the bars may be removed for cleaning, and the location of the gland bodies will determine the position of a simple cylindrical bar, set in place as shown with relation to the bottom of the bowl.

Figure 6:
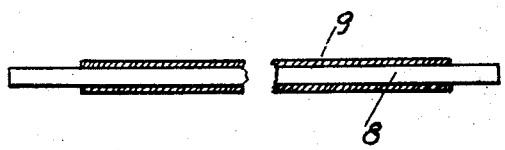
Figure 6 is a detail of a type of bar having a revolving sleeve, which illustrates one way of accomplishing a desirable rotary action.

As the mixing blades move through a mass of dough the dough engages the bars and is pulled out and extended. The bars may be formed as in Figure 6 in which there is a sleeve 9 mounted over the bar 8, which sleeve can revolve and hence will move with the dough and partially relieve the retarding and hence extending action on the dough.

Figure 5:
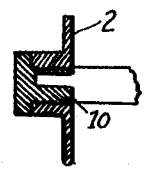
Figure 5 is a detail section of one of the bearings for the bowl, showing the eccentric bushing structure.

In Figure 5 is shown a variant of the gland structure in which the head of the gland receives an eccentric bushing 10. The end of the shaft seats in the bushing, and the gland head holds the bushing fast in place. In this structure the gland head can be released, the bushing revolved, and the head then tightened down again, thereby holding the bar in an adjusted position with relation to the bottom of the bowl.

Referring to Figures 2 and 3, I have shown in connection with the sides of the bowl, a plate 11, which is mounted on the outside of the bowl, on both sides, for the purpose of providing a strongly braced member, that has integral therewith a hook 12. A stop bar 13 is secured to the standards or housings of the mixer, against which these hooks engage, so as to provide a positive rest and stop for the bowl when in vertical position. I employ these plates for providing the mounting members for the glands that support the bars.

In this structure I have shown the gland bodies 13ª formed in these plates, said bodies opening into the interior of the bowl. The gland heads 14 are tubular in shape, as in the usual shaft gland, and the bars are thus set into the gland heads. When the bolts 15 are tightened down, the packing will grip the bars 16, and hold them in adjusted position transverse the interior of the bowl.

In the example illustrated I have set the glands on one side of the bowl somewhat out of line with those on the other side, so that the sphere of action of the two rods is somewhat different, giving a particular desired action on the dough in the mixer. It is evident that the eccentric adjustment could be provided in this instance also, and that the direction of extension of the bars will follow the original nature of the gland bodies.

It will not be necessary to illustrate other ways of accomplishing my essential object, and the various advantages thereof, since it is believed to be evident that by providing for an external mounting for the bars, instead of forming ribs or humps, within the bowl bottom, or riveting abutment strips inside of the bowl bottom, I have provided a new range of advantage to the manipulation of dough in a mixer. Instead of having a structure which is secured to the weakest portion of the device, I have provided one which is secured to the strongest. Instead of having a fixed unevenness of the interior surface of the bowl, I have provided for removable devices, the position of which can be controlled, and the length of which across the bowl may be adjusted.

Should it be advisable to provide some kind of an abutment or rest for the bars within the bowl bottom, this would not take the main strain on the parts, which would still be on the sides. Thus I have provided a mixer in which proper physical strength is present, and in which the mixer can be used with the dough abutment feature or without it, as desired, and in which a rotating abutment may be used or a fixed one as desired.

Having thus described my invention, what I claim as new and desire to secure by Letters Patent, is:—

1. In a dough mixer the combination of a bowl having a bottom and sides, of a dough abutment bar extending across the interior of the bowl, and means for mounting said bar in the sides of the bowl on the outside, said means comprising a gland in which the bar is engaged, and said gland having a hollow body and head through which the bar passes, whereby adjustment of the extension of the bar across the interior of the bowl is provided.

2. In combination with a dough mixer bowl having a bottom and sides, of a dough abutment bar extending across the interior of the mixer, and means for mounting said bar in the side of the bowl on the outside so as to be adjustable lengthwise.

3. In combination with a dough mixer bowl having a bottom and sides, of a dough abutment bar extending across the interior of the mixer, and means for mounting said bar in the side of the bowl on the outside so as to be adjustable eccentrically, whereby the spacing of the bar from the bottom of the bowl is provided.

4. In combination with a dough mixer bowl having a bottom and sides, an abutment member supported on the outside of the bowl and extending within the bowl, with eccentric means for mounting said member adapted to regulate the position of the member with relation to the sides of the bowl.

5. In combination with a dough mixer bowl having a bottom and sides, abutment means eccentrically mounted on the outside of the bowl and extending within the bowl, and a sleeve loosely mounted on the abutment means within the bowl.

6. In combination with a U shaped dough mixing bowl having an agitator therein for mixing a dough mass, rotatable means extended parallel with the axis of the agitator and substantially in alignment with the axis of rotation of said means for engaging a dough mass during its agitation within the bowl, said means rotatable about its own axis with the engagement thereof by the agitating dough mass.

7. In combination with a U-shaped dough mixing bowl having an agitator therein for mixing a dough mass, rotatable means extended parallel with the axis of the agitator and substantially in alignment with the axis of rotation of said means for engaging a dough mass during its agitation within the bowl, said means rotatable about its own axis with the engagement thereof by the agitating dough mass, said means comprising a bar having a sleeve loosely mounted thereon.

8. In combination with a U shaped dough mixing bowl having an agitator therein for mixing a dough mass, rotatable means extended parallel with the axis of the agitator and substantially in alignment with the axis of rotation of said means for engaging a dough mass during its agitation within the bowl, said means rotatable about its own axis with the engagement thereof by the agitating dough mass, and means for adjusting the position of the rotatable means so that the relative operative position of said means and the bowl wall may be varied.

9. In combination with a dough mixing bowl having an agitator mounted for rotation with its axis in a substantially horizontal plane therein, means disposed within said bowl below the axis of said agitator and substantially parallel therewith for engaging the dough mass during its agitation, said means rotatable about its own axis.

FRANK X. LAUTERBUR.